(No Model.)
W. J. CAMPBELL.
SEAT ATTACHMENT FOR PLOWS.
No. 605,994. Patented June 21, 1898.
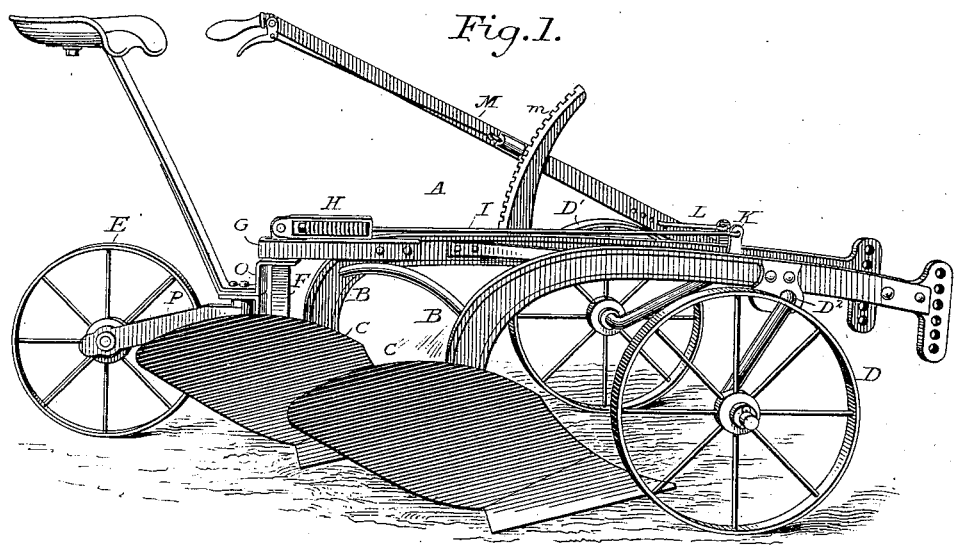
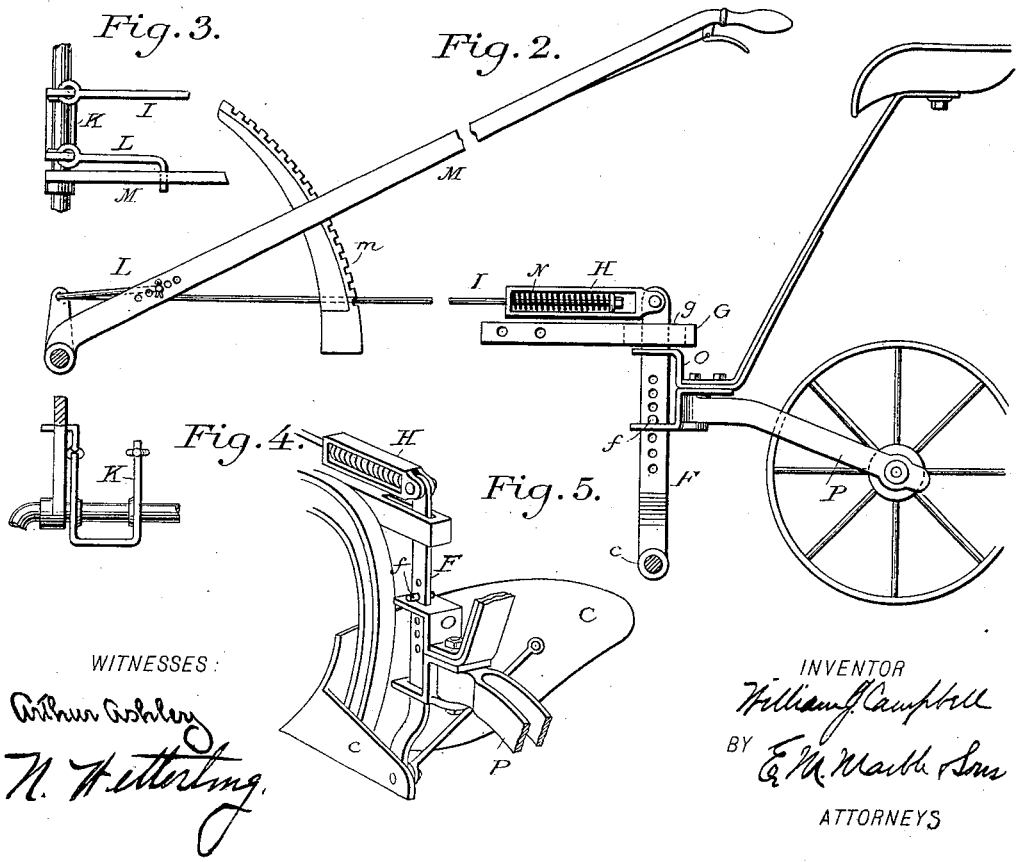
WITNESSES:
Arthur Ashley
N. Wetterling
INVENTOR
William J. Campbell
BY E. M. Marble & Sons
ATTORNEYS

UNITED STATES PATENT OFFICE.

WILLIAM J. CAMPBELL, OF MILTON, NORTH DAKOTA.

SEAT ATTACHMENT FOR PLOWS.

SPECIFICATION forming part of Letters Patent No. 605,994, dated June 21, 1898.

Application filed January 7, 1898. Serial No. 665,872. (No model.)

*To all whom it may concern:*

Be it known that I, WILLIAM J. CAMPBELL, a citizen of the United States, residing at Milton, in the county of Cavalier and State of North Dakota, have invented certain new and useful Improvements in Seat Attachments for Plows; and I do hereby declare the following to be a full, clear, and exact description of the invention, such as will enable others skilled in the art to which it appertains to make and use the same.

The object of my invention is to provide a seat attachment for plows which will perform the double function of enabling the operator to ride and of rendering easier the manipulation of the plow.

I aim to provide a seat attachment for plows which will minimize as far as possible the jolting to which the operator when riding would ordinarily be subjected on account of the rough nature of the ground over which the plow must pass, and which will also, through adjustment of the same, to a certain extent control the position of the moldboard and connected parts relative to the ground. Simplicity in construction and operation, as well as strength, I have endeavored to secure.

In accomplishing the object of my invention I make use of any ordinary type of plow in connection with which forward truck-wheels are employed and a rear or furrow wheel.

My improvement lies in the novel construction of the connection between the rear or furrow wheel and the plow-beam and in the support which I have arranged for the rider's seat. The connection between the rear or furrow wheel and the plow-beam is of a toggle-joint nature and permits the distance between the rear wheel and the plow proper to be changed, so that the furrow-wheel can be brought nearer to or removed farther from the plow proper. As the rear or furrow-wheel supports the rear end of the plow, at which the moldboards are found, the construction which I have devised enables me to control the position of the moldboard relative to the ground by the position of the furrow-wheel. By alteration in the position of the furrow-wheel the moldboard can be raised entirely clear of the ground, so that the plow can be moved from one point to another, or it may be lowered into operative position. The support for the seat forms a part of the mechanism for controlling the position of the rear or furrow wheel, simplicity of construction being thus assured, and is of a spring nature, so that the plow proper may rise or fall as it passes over rough ground without the position of the seat being altered.

My invention is fully illustrated in the drawings which accompany and form a part of this specification, in which the same reference-letters refer to the same or corresponding parts, and in which—

Figure 1 is a perspective view of a plow provided with my attachment, looking from the rear. Fig. 2 is an elevation of the parts of my attachment removed from the plow. Figs. 3 and 4 are detail views.

Referring to the drawings, A represents the plow as a whole. The type of plow shown is a gang-plow having two plowshares; but I do not limit myself to the use of my attachment in connection with a plow of the nature of that shown in the drawings, as it may be used upon any type of plow.

B represents the plow-beam, and C the plowshares.

I shall not describe the parts of the plow which are common with all plows and which form no part of my invention, but shall limit my description to those parts of the plow which relate to my improved device.

The plow is supported upon three wheels arranged in a triangle—the two front wheels D and D' and the rear or furrow wheel E. The front wheels D and D' are mounted upon a truck D², which is connected to the forward end of the plow-beam and supports the same. The rear or furrow wheel E is connected to the plow proper in such a manner as to permit the distance between the same and the plow to be increased or decreased and thus by changing the support for the plow lowering or raising the moldboards from the ground. The connection is as follows: To the landside *c* of the plowshare is attached the rod F. The attachment of the rod F is pivotal in its nature, so as to allow the rod, which is vertically arranged, to move forward or back through a slight arc limited by other features of construction of the plow. The upper end of the rod F passes through the slot *g* in the bracket G, which extends rearwardly from the upper part of the plow-beam B. The slot in the bracket G is sufficiently long to permit the arc movement of the shaft which is designed. To the upper end of the rod F is bolted or otherwise secured the bracket H, which extends horizontally toward the front of the plow and is formed with an opening in its front end, through which passes the rod I, which is governed in position by means of the U-shaped bracket K, rod L, and hand-lever M, the position of which on the rack-segment $m$ can be governed by the rider. On the end of the rod I and between the nut $i$ and the inner surface of the forward end of the bracket G is mounted a spiral spring N. The strength of the spring is subject to adjustment by movement of the hand-lever M, for if the hand-lever M be moved to its lowest point the end of the rod I will be at the end of the bracket G, and the coils of the spring N will be in their most relaxed position, while if the hand-lever M be raised the rod I will be drawn outward and the coils of the spring N contracted.

On the vertically-arranged rod F slides the bracket O, which forms the end of the support O' for the seat $O^2$. To the bracket O are pivotally attached the forks P, which form bearings for the rear or furrow wheel E.

When the bracket O is adjusted to its upper position on the rod F, the furrow-wheel E is brought nearer to the body of the plow, and the rear end of the plow is consequently raised, lowering the points of the plowshares so that they are in operative position. If, on the contrary, the bracket O is slid downward on the rod F, the furrow-wheel is farther away from the body of the plow, the rear end of the plow is lowered, and the moldboards are raised quite a distance from the ground, so that the plow can be moved from place to place.

The bracket O may be held in any desired position on the rod F by some suitable means, such as the pin $f$, which is inserted in the holes formed on the rod F.

I have stated that the seat-support O' has secured to its lower end the bracket O, which slides upon the rod F, and that the rod F is so connected to the plow that it is allowed forward-and-back movement. The vibratory movement thus permitted takes up the shock occasioned by the passage of the plow over the rough ground over which it must pass in the use of the same and permits the driver to have a steady seat, free from vibration and jolt. The driver's seat is so placed that the driver can readily operate the hand-lever M, and thus, through the rods I and L, adjust the amount of vibration permitted to the rod F.

It is to be noted that the rod F is formed at its lower end with an inward bend, so that the furrow-wheel will follow the center of the furrow.

My improvement may be made in many forms, and I do not limit myself to the precise construction shown, but

What I claim as new, and desire to secure by Letters Patent, is—

1. In a plow, the combination with a plow-beam, a plowshare, front wheels and a rear or furrow-wheel, of an adjustable connection between said rear wheel and said plow-beam, whereby said rear wheel can be brought closer to or removed farther from said plow-beam, and the position of the plowshare relative to the ground correspondingly altered, substantially as described.

2. In a plow, the combination with a plow-beam, a plowshare, front wheels, and a rear wheel, of a rod attached to the landside of the plowshare, an adjustable bracket mounted thereon, and connection between said bracket and said rear or furrow wheel, substantially as described.

3. In a plow, the combination with a plow-beam, a plowshare, front wheels and a rear wheel, of a rod attached to the landside of said plowshare, an adjustable bracket mounted thereon, a seat secured thereto, and pivotal connection between said rear wheel and said seat-support, substantially as described.

4. In a plow, the combination with a plow-beam, a plowshare, front wheels and a rear wheel, of a vertical rod attached to the landside of said plowshare, means for permitting vibration of the upper end of said rod, an adjustable bracket mounted thereon, and a seat secured to said bracket, substantially as described.

5. In a plow, the combination with a plow-beam, a plowshare, front wheels and a rear wheel, of a vertical rod attached to the landside of said plowshare, means for permitting vibration of the upper end of said rod, an adjustable bracket mounted thereon, a seat secured to said bracket, and pivotal connection between said rear wheel and said seat-support, substantially as described.

6. In a plow, the combination with a plow-beam, a plowshare, front wheels and a rear wheel, of a vertical rod pivotally attached to the landside of said plowshare, a bracket attached to the upper end of said rod, a rod passing through said bracket, a spring mounted on said rod and bearing against said bracket, and means for controlling the position of said rod and consequently the strength of said spring, substantially as described.

7. In a plow, the combination with a plow-beam, a plowshare, front wheels and a rear wheel, of a vertical rod pivotally attached to the landside of said plowshare, a bracket attached to the upper end of said rod, a rod passing through said bracket, and the hand-lever M, U-shaped bracket K, and rod L for controlling the position of said rod and consequently the strength of said spring, substantially as described.

In testimony whereof I affix my signature in presence of two witnesses.

WILLIAM J. CAMPBELL.

Witnesses:
J. H. McCULLOUGH,
F. W. McLEAN.